United States Patent
DeBoer et al.

(10) Patent No.: US 7,907,388 B2
(45) Date of Patent: Mar. 15, 2011

(54) PANEL LAYOUT FOR AN INTEGRATED POWER DISTRIBUTION SYSTEM

(75) Inventors: John DeBoer, Decatur, GA (US); Megan Rahn, Dallas, TX (US); John David Stephenson, Roswell, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 560 days.

(21) Appl. No.: 11/519,592

(22) Filed: Sep. 12, 2006

(65) Prior Publication Data

US 2007/0064377 A1    Mar. 22, 2007

Related U.S. Application Data

(60) Provisional application No. 60/716,220, filed on Sep. 12, 2005.

(51) Int. Cl.
*H02B 1/20* (2006.01)

(52) U.S. Cl. ........ 361/628; 361/627; 361/641; 361/644; 307/38; 700/22; 700/286

(58) Field of Classification Search ............... 361/627, 361/622, 626, 628, 641, 644; 307/38; 70/22, 70/286
See application file for complete search history.

(56) References Cited

U.S. PATENT DOCUMENTS

| | | | | |
|---|---|---|---|---|
| 3,366,845 A * | 1/1968 | Esler | | 361/660 |
| 3,522,588 A * | 8/1970 | Clarke, Jr et al. | | 340/825.56 |
| 4,354,217 A * | 10/1982 | Mahon | | 361/104 |
| 4,472,761 A * | 9/1984 | Koslosky et al. | | 361/638 |
| 4,530,032 A * | 7/1985 | Perry, II | | 361/610 |
| 4,777,607 A * | 10/1988 | Maury et al. | | 700/286 |
| 4,920,476 A * | 4/1990 | Brodsky et al. | | 700/22 |
| 5,099,382 A * | 3/1992 | Eppinger | | 361/115 |
| 5,184,278 A * | 2/1993 | Jordan et al. | | 361/627 |
| 5,301,083 A | 4/1994 | Grass et al. | | |
| 5,386,363 A * | 1/1995 | Haak et al. | | 701/3 |
| 5,705,862 A | 1/1998 | Lutz et al. | | |
| 5,789,828 A * | 8/1998 | Tremaine et al. | | 307/64 |
| 5,861,683 A | 1/1999 | Engel et al. | | |
| 6,320,732 B1 | 11/2001 | Norman et al. | | |
| 6,430,036 B1 * | 8/2002 | Cornell et al. | | 361/648 |
| 6,445,585 B1 * | 9/2002 | Walker | | 361/724 |
| 6,501,233 B1 * | 12/2002 | Odell et al. | | 315/294 |
| 6,504,694 B1 | 1/2003 | Bilac et al. | | |
| 6,532,506 B1 * | 3/2003 | Dunstan et al. | | 710/100 |
| 6,671,148 B2 | 12/2003 | Evans et al. | | |
| 6,798,191 B1 * | 9/2004 | Macfarlane et al. | | 324/157 |
| 7,143,215 B2 * | 11/2006 | Dunstan et al. | | 710/104 |
| 7,327,558 B2 * | 2/2008 | Kennedy et al. | | 361/668 |
| 7,566,986 B2 * | 7/2009 | DeBoer et al. | | 307/31 |
| 2004/0075343 A1 * | 4/2004 | Wareham et al. | | 307/39 |
| 2007/0222295 A1 * | 9/2007 | Wareham et al. | | 307/32 |

* cited by examiner

*Primary Examiner* — Robert J Hoffberg
(74) *Attorney, Agent, or Firm* — Jose R. de la Rosa

(57) ABSTRACT

A power distribution apparatus for distributing electrical power includes circuit breaker modules and remote operated devices mounted separately in a panel. The devices may be relays, circuit breakers, meters, dimmers or other devices for controlling a circuit. An I/O controller board is connected to the remote operated devices and controls those devices through a data rail. A control module may interface with the I/O controller board and may also interface with other I/O controller boards and with one or more networks. The I/O controller board is mounted in the subfeed breaker region of the panelboard, at an end of the panelboard opposite the main breaker region. The controller board may include connection and status features that are accessible through the deadfront.

25 Claims, 11 Drawing Sheets

PANEL LAYOUT FOR AN INTEGRATED POWER DISTRIBUTION SYSTEM

CROSS REFERENCE TO RELATED APPLICATIONS

This application claims the benefit of U.S. Provisional Application Ser. No. 60/716,220 entitled "Integrated Lighting Control," filed on Sep. 12, 2005, the contents of which are hereby incorporated by reference herein in their entirety.

FIELD OF THE INVENTION

The present invention relates generally to residential and commercial electrical power distribution panels and components, and more particularly, to an apparatus and method for selectively providing power to circuits served by such panels and components.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels" or "panelboards") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

A panelboard, such as the panelboard 900 shown in FIG. 9, typically has three regions: main/incoming breaker region 910, a branch breaker region 950, and subfeed breaker region 980. In the main/incoming breaker region 910, power enters the panel and is connected to the panelboard via a main power connector such as a main circuit breaker or main lugs (not shown). From that region, power is distributed via a bus system to a plurality of branch circuit breakers (typically 1-42 devices).

In the branch breaker region 950 of the panelboard, branch circuit breakers (not shown) switch and protect the individual loads.

The final region is the subfeed region 980. In that region a subfeed breaker or subfeed lugs (not shown) may be used to continue the power from the panelboard bus to an additional "downstream" load. The subfeed region is often a mirror image of the main breaker region in order to given the panel symmetry. Utilization of the subfeed region of a panelboard is dependant upon the application. Subfeed regions become critical as the panel is positioned closer to the incoming power. In existing lighting applications, that region is often left unused.

Referring to FIG. 10, corresponding with the three regions of a circuit breaker, the deadfront 1000 of the panelboard 900 often possesses three cutout regions. The deadfront 1000 is a grounded piece of metal that separates the user of a panelboard from all apparatus contained within the panelboard.

A first region 1010 of the deadfront 1000 is a cutout for the main breaker. That cutout allows a user to operate the handle of a main breaker while leaving the panelboard energized. A second region 1050 of cutouts within the panelboard is the branch breaker cutouts. Those cutouts allow a user to operate handles of all branch breakers. Those cutouts also provide status/position information back to the user. Most commonly, the position of the circuit breaker's handle indicates status. In the case of remote controlled devices, discussed below, the status of the remote controlled device is indicated through these holes.

The third region 1080 of the deadfront 1000 is the sub-feed breaker cutout. That cutout is traditionally used in a manner identical to that of the main breaker cutout 1010. When no sub-feed breaker is present, that cutout is traditionally covered with an additional plastic barrier.

In addition to electrical distribution and the protection of circuitry from overcurrent conditions, components have been added to panelboards for the control of electrical power to loads connected to circuit breakers. For example, components have been used to control electrical power for lighting. In the case of a lighting control system, either a remote controlled circuit breaker or a normal circuit breaker with an attached lighting control accessory such as a relay, is located at least partly within the branch breaker region of the panelboard.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

A disadvantage of such a system is that the panel control unit contains complex electronics for each of the circuit breaker positions on the panel. There are typically 42 such positions. The electronics for all 42 positions is built into the switchgear whether or not circuit breakers are actually installed in all positions. For example, a customer may purchase a panel having only 6 of the 42 circuit breaker positions occupied. That customer would be required to purchase the electronics for all 42 positions, because the electronics is already contained in the single control unit.

It would be advantageous is to place the breaker control electronics in the breakers themselves, and simply send messages over a bus addressed to individual breakers. Such a decentralized control solution, however, requires a reliable addressing technique, wherein individual breakers located in specific positions on the panel may be identified and commanded. The addressing system must be robust enough to withstand the electrically noisy environment of the electrical power distribution panel.

That decentralized scenario would require that each individual breaker be identified to the control unit as being in a certain position in the panel. In one possible solution, a control unit interface prompts the customer to identify breakers with panel positions, for example, by pushing a button on a breaker when a position is prompted. That technique would place a significant burden on the customer when the breakers are installed or replaced, and relies on internal memory in the breaker to maintain reliability.

In another possible scenario, the breaker itself may read a resistance or another electronic indicator associated with a specific position in the panel. For example, a resistor may be placed on the control bus at each breaker position. The breaker would read the resistance and identify itself to the controller as being in a particular position corresponding to that resistance. That technique would require the expense of indicators at every panel position, and electronics in the breaker to perform the initialization routine.

Special panel boards and enclosures are typically utilized for systems permitting remote operation of circuit breakers. Specifically, panels are extended in length in order to accommodate a control unit. For example, a special panel may be constructed having an end that is extended to fit the panel control unit. Such a design precludes retrofitting standard panels and enclosures for use with remote-operated circuit breakers.

There is therefore presently a need to provide an improved method and system for selectively distributing power from a power distribution panel. The method and system must be robust enough to withstand the high ambient noise levels inherent in power distribution systems, and must be highly reliable. Unnecessary cost should be minimized, especially when breaker positions are left open in the panel. The physical panel layout should be such that existing non-remote actuated panel designs can be retrofitted with the necessary components.

SUMMARY OF THE INVENTION

One embodiment of the present invention is a system for selectively distributing electrical power from an electrical power source to a plurality of load circuits. The system comprises a panelboard having first and second ends; a main power connector at the first end of the panelboard for connecting the electrical power source; a plurality of remote operated devices, each device being electrically connected to the main power connector and to at least one of the plurality of load circuits; and an I/O controller board electrically connected to the remote operated devices for controlling the remote operated devices, the I/O controller board being at the second end of the panelboard.

The system may further comprise a data rail interconnecting the plurality of remote operated devices and the I/O controller board.

The system may include a system controller connected to the I/O controller board for controlling the I/O controller board, the system controller being at the second end of the panelboard. The system controller may further include an interface for controlling at least one additional I/O controller board.

The system may further comprise a plurality of circuit breaker modules, each circuit breaker module being in a load circuit position in the panelboard and electrically connected to the electrical power source in series with a remote operated device in the position. The remote operated device may be removable from the panel separately from the circuit breaker module.

The remote operated device may be a relay, a dimming device, a metering device, a circuit breaker or another device.

The system may further include a deadfront mounted to the panelboard, the deadfront at least partially covering the I/O controller module; wherein the I/O controller module further comprises at least one feature accessible through an opening in the deadfront. The accessible feature may be a feature selected from the group consisting of an LED indicator for status and power, an EIB building automation connection, an Ethernet connection, a USB port and a telephone connection. The I/O controller module may further include at least one feature not accessible through an opening in the deadfront.

The system may include a snap lid for covering the accessible features, the snap lid being removable through an opening in the deadfront. The removable snap lid may be flush with the I/O controller board.

The I/O controller board may be mountable to the panelboard using at most two screws.

Another embodiment of the invention is a method for configuring a power distribution panel. The method includes the steps of installing a main breaker in a main breaker region of a panelboard; installing a remote operated device in a branch breaker region of the panelboard, the main breaker and the remote operated device being electrically connected for distributing electrical power to a branch circuit; and installing an I/O controller board in a subfeed region of the panelboard different from the main breaker region and the branch breaker region, the I/O controller board being electrically connected to the remote operated device for commanding the device to perform an operation on the electrical power distributed to the branch circuit.

The step of installing the I/O controller board may further comprise installing a bus bar for electrically connecting the I/O controller board to the remote operated device. The data rail may be secured directly to the panelboard and may support the remote operated device.

The method may include the step of mounting a deadfront to the panelboard, the deadfront having openings for portions of the I/O controller board. The I/O controller board may include a touchscreen, and one opening of the deadfront may expose the touchscreen. The I/O controller board may include I/O connectors, and one opening of the deadfront may expose at least one of the features.

The method may further comprise the step of mounting a removable snap lid on the I/O controller board through an opening in the deadfront for covering accessible features. The step of mounting a removable snap lid may include grasping the snap lid by pinching recess features.

The step of installing an I/O controller board in a subfeed region of the panelboard may comprise using at most two screws.

DESCRIPTION OF THE INVENTION

The integrated lighting system of the present invention permits a user to control (e.g., switch on and off, dim, meter) power circuits such as those typically used for lighting, resistive heating, air conditioning or other any other electrical device in the home, office or industrial environment. The control is implemented via a system of lighting panels or panelboards. In a preferred embodiment, each panel manages up to 42 circuits.

Figure 1:
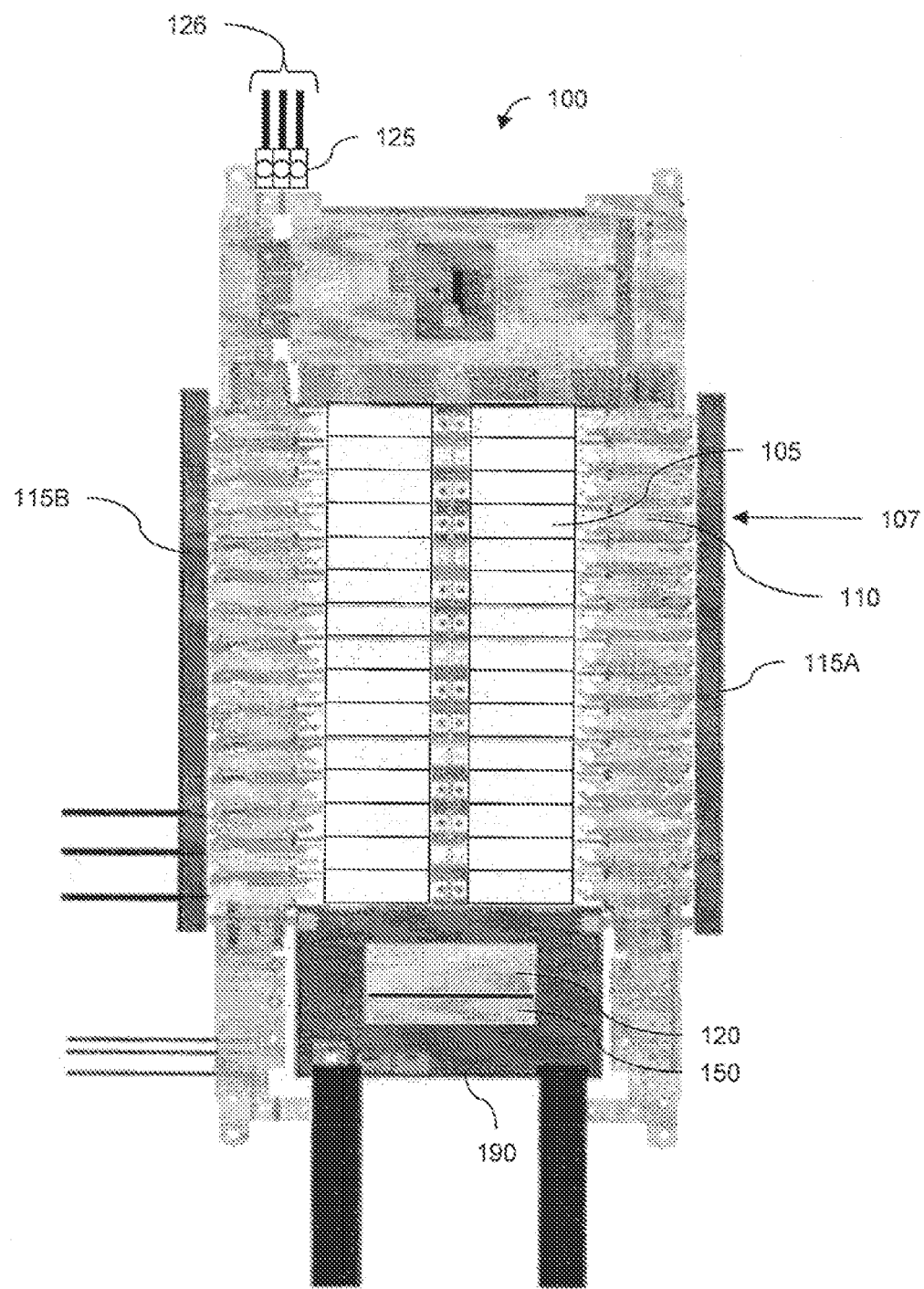
FIG. 1 is a schematic plan view of a power distribution panel according to one embodiment of the invention.

An exemplary panel 100 according to one embodiment of the invention is shown in FIG. 1. Line power enters the panel through power source cables 126 connected to lugs 125. Line power may, for example, be a 3-phase 480Y/277, 240 or 120 VAC power source. Each load circuit in the panel corresponds to a load circuit position such as position 107, fed by the power source. In each fed position 107 is a circuit breaker such as breaker 105. In a preferred embodiment, a Siemens BQD circuit breaker is used.

In accordance with the invention, each circuit that is to be controlled also has a remote operated device 110, such as a relay, a meter or a dimmer. The term "remote operated device" as used herein includes any other device that controls, monitors or may otherwise be used in a load circuit. While, in a preferred embodiment, the remote operated device is a separate component from the circuit breaker, the term "remote operated device" as used herein encompasses devices integral with the circuit breaker. The remote operated devices 110 are connected to data rails 115A, 115B installed along both sides of the panel. An I/O controller board 120 controls the remote operated devices 110 through the rails 115A, 115B.

Figure 2:
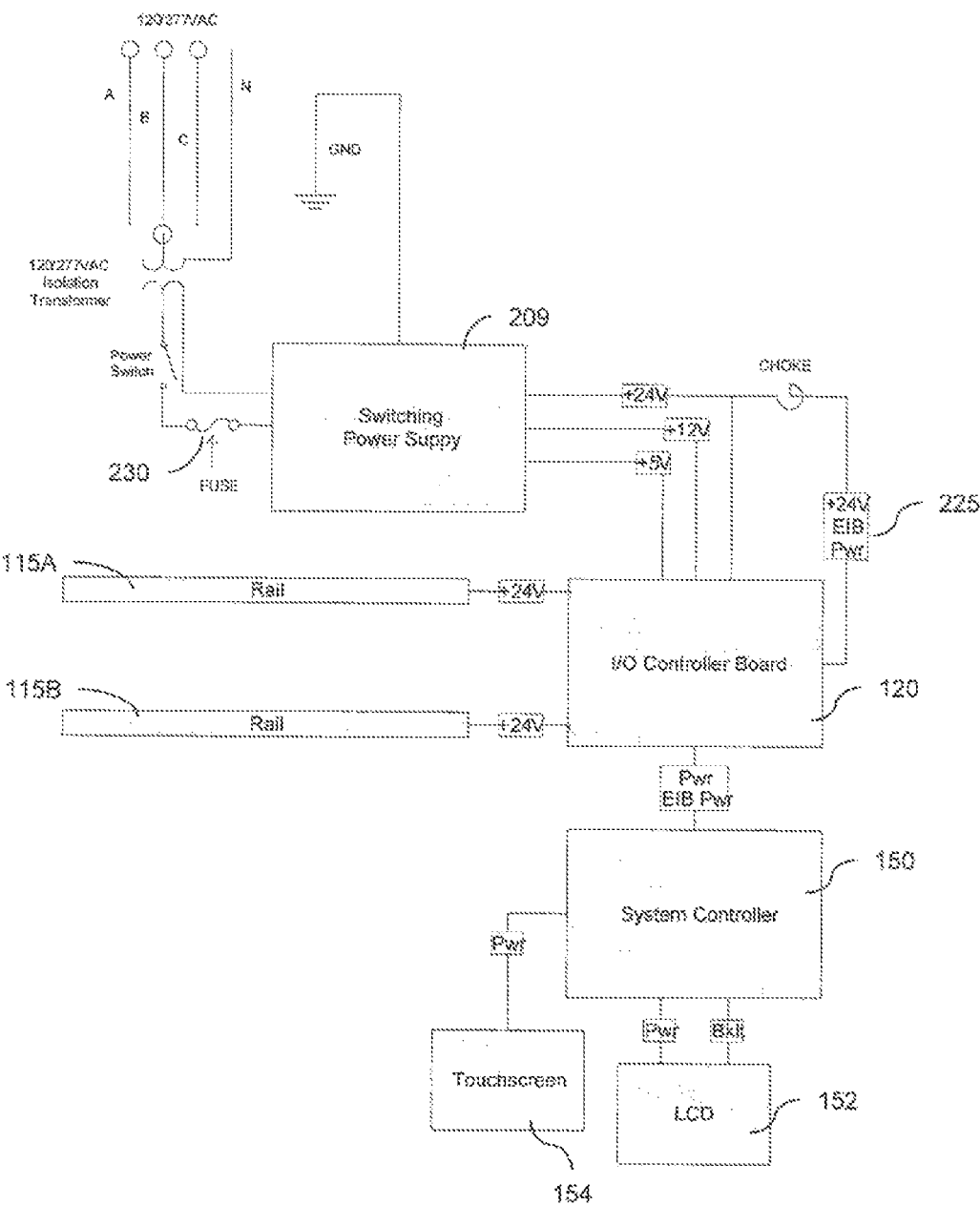
FIG. 2 is a schematic diagram of the switching power supply of a power distribution panel according to one embodiment of the invention.

A switching power supply module 209, shown in FIG. 2, supplies switching power to the I/O controller board 120 and through the board 120 to the rails 115A, 115B. Power to a system controller 150 including an LCD display 152 and/or touch screen 154, described in more detail below, is also provided through the I/O controller board 120.

Figure 3:
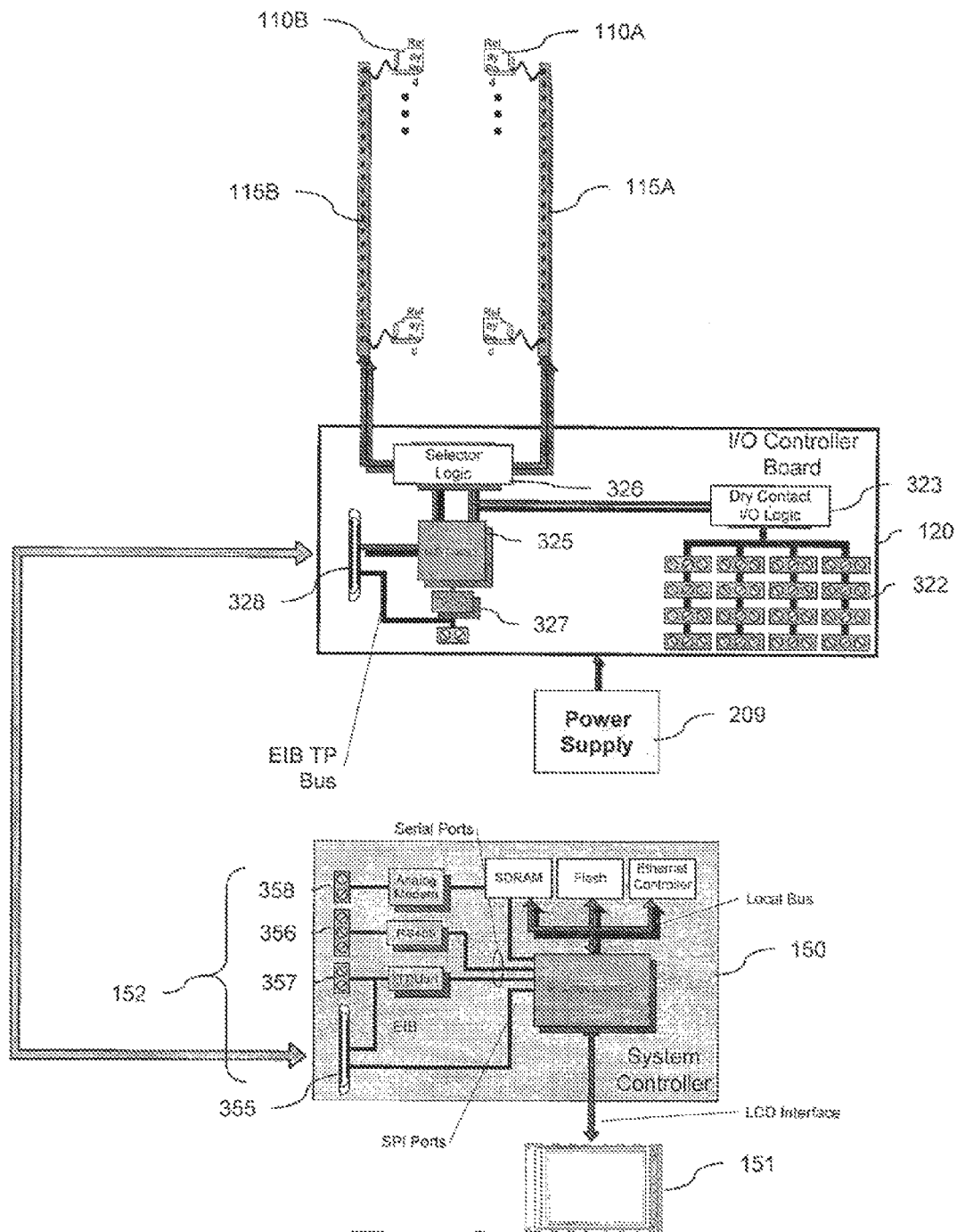
FIG. 3 is a schematic diagram of a stand-alone power distribution panel according to one embodiment of the invention.

In one embodiment of the invention, shown in FIG. 3, the I/O controller board 120 functions as a stand-alone distributed I/O block in a power distribution system. In that case, each panel functions as a standalone panel. The I/O controller board 120 supplies power and control signals through the rails 115A, 115B to the remote operated devices 110A, 110B. A user interface and high-level scheduling and control are provided by a control module 150. The control module 150 may provide dry contact I/O (not shown), a LCD touch screen user interface 151, and several addition communication ports 152. The control module provides an application that gives the user a means of configuring control schedules, organizing remote operated devices into groups, assigning schedules to groups, configuring the discrete I/O functionality, and configuring the distributed I/O functions.

Figure 4:
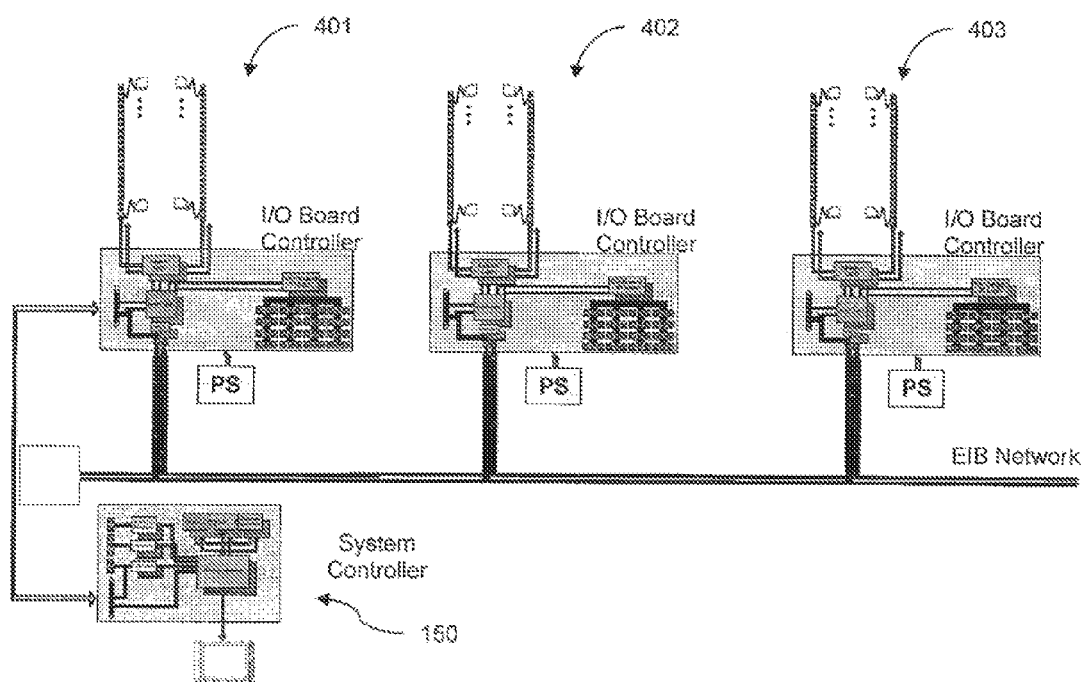
FIG. 4 is a schematic diagram of a network of power distribution panels according to one embodiment of the invention.

In another embodiment shown in FIG. 4, multiple panels 401, 402, 403 are configured to work as a single unit with one panel 401 being configured as a master, and the other panels configured as slaves. To configure the panel 401 as a master, the system controller 150 is added. The slave panels 402, 403 contain no system controller.

Figure 5:
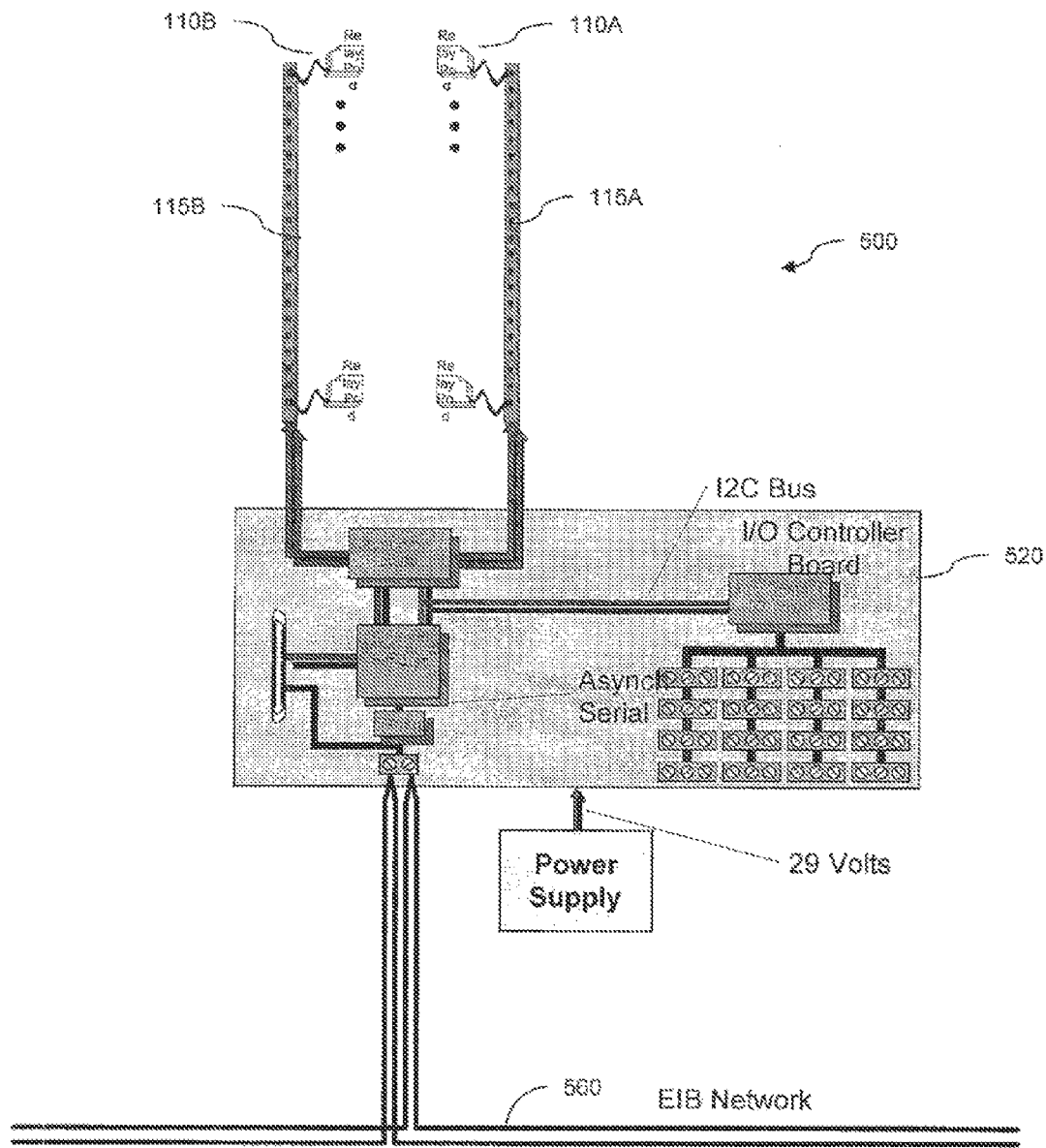
FIG. 5 is a schematic diagram of a slave power distribution panel according to one embodiment of the invention.

An exemplary slave panel 500 is shown schematically in FIG. 5. The I/O controller board 520 powers and controls the remote operated devices 110A, 110B through rails 115A, 115B, respectively. The I/O controller board is connected to other slave panels and a master panel through an EIB (European Installation Bus) network 560 or other similar network.

The integrated power distribution system of the present invention may utilize components from existing systems, thereby decreasing tooling and inventory costs, training requirements, etc. For example, returning to FIG. 1, the system of the invention may utilize an existing panel board 100 and an existing circuit breaker 105 used with that panel board in presently-used power distribution systems. In that case, new components include the remote operated device 110 that connects to the load side of the breaker 105. Wiring to the loads is connected to the remote operated device. The remote operated device contains electronics necessary to connect to and communicate with the I/O controller board 120 in the panel. The data rails 115A, 115B are added to the existing panel design down the length of the breakers 105, providing a means for connecting the remote operated devices 110 to the controller 120.

At either the bottom or the top of panel 100, as dictated by whether the panel is top-fed or bottom-fed, is the device interface module 120. In a preferred embodiment, the device interface module 120 is near an edge of the panel opposite the power feed lugs 125. The device interface module contains the minimum functionality to allow it stand alone, or to serve as a slave panel to another panel on an EIB network. The control module 150 may can be added as described above.

Individual components of the inventive system will now be described in turn. Referring to schematic illustrations of FIGS. 6 & 7, the remote operated device 110 may be an electromechanical relay or another device that connects to the load side of the breaker 105 through a first terminal 613. A wire connection to a lug or second terminal 611 is then made from the load to the load side of the remote operated device 110. In the particular example of FIG. 7, the remote operated device is a remote operated relay.

The remote operated device 110 includes a circuit board 750 with a microprocessor 790 and a four- or five-wire connector 616 for connection to the data rail 115. The connector to the data rail includes terminals for a common connection 661, a 24 volt power connection 662 for operating the electronics and the solenoid, a select line 663 used by the device interface module to select a particular remote operated device, and a serial communication interface line 664. In the relay example of FIG. 7, the processor 750 in the remote operated device 110 manages timing of the application of power to a solenoid 751 to minimize power required from the 24 volt connection 662 and also to insure the proper operation of the solenoid. The processor contains instructions stored on non-volatile media for performing various tasks including opening and closing the relay switch 760 via the solenoid 751, and verifying a position of the relay switch 760 using a sensor 752.

A unique select line is assigned to each breaker/remote operated device position within the panel. For example, in the schematic illustration of FIG. 6, select line 663 is connected to the remote operated device 110 in position 1; select lines 673, 683, 693 are connected to remote operated devices 670, 680, 690 in positions 2, 3 and 4, respectively. Select lines may therefore be individually asserted by the I/O controller board 120 (FIG. 3) to select single remote operated devices.

When the select line 663 is asserted, the remote operated device 110 listens for messages on the serial interface 664. Conversely, messages on the serial interface 664 are ignored if the select line is not asserted. A response by the remote operated device to a serial command is therefore conditional on whether the select line is asserted. The term "asserted," as used herein, means one state of a signal designated to cause the remote operated device to listen for messages. In a preferred embodiment, the select line has "high" and "low" states, the "high" state being the "asserted" state.

Addressing using the select lines is specific to a particular position in the panel because the select lines are physically routed to particular positions. It is not necessary for the remote operated devices to be aware of their positions in the panel to identify which incoming messages on the serial line are addressed to them. Instead, the remote operated device identifies a relevant message on the serial line by monitoring whether the select line is asserted. No initialization of the remote operated devices to assign panel positions is necessary. The location of the remote operated device 110 within the panelboard is therefore uniquely identified by I/O controller board 120 without the need for initialization or set up (i.e., each remote operated device can be controlled without the need for a switch and LED to predetermine the address, thus no user intervention is required prior to first use).

The addressing system of the invention is a robust system that is resistant to the electrical noise encountered in the power distribution environment of the panel. Because the remote operated device listens for messages on the serial line only when the select line is asserted, the probability of noise being interpreted as a message is greatly reduced. Further, because the select signal is a simple on/off or high/low signal, the probability is small of a remote operated device incorrectly executing a command intended for another remote operated device.

The command messages may be either broadcast commands or point-to-point communications. The message may, for example, be a command to open or close a relay in the remote operated device, a request for status, a request for an error report, a reprogramming command, a command for dimming functions for adjusting or measuring power to the load circuit (if the remote operated device contains such functionality), a request for a full diagnostic, or other operational commands.

The remote operated device 110 is attached to the load side of a circuit breaker 105 within a panelboard 100 using a conductor tab 613 (FIG. 6) inserted into the breaker lug (not shown). The remote operated device 110 has a lug of the same size as that of the breaker on the opposite side from the tab for installing a load wire.

In one exemplary embodiment, the remote operated device 110 may be a relay having a mechanical override switch (not shown) used to close the relay contacts manually. In addition, each remote operated relay may have an indicator (not shown) to show the position of the relay contacts. The override switch and indicator are functional without power applied to the remote operated relay.

Figure 7:
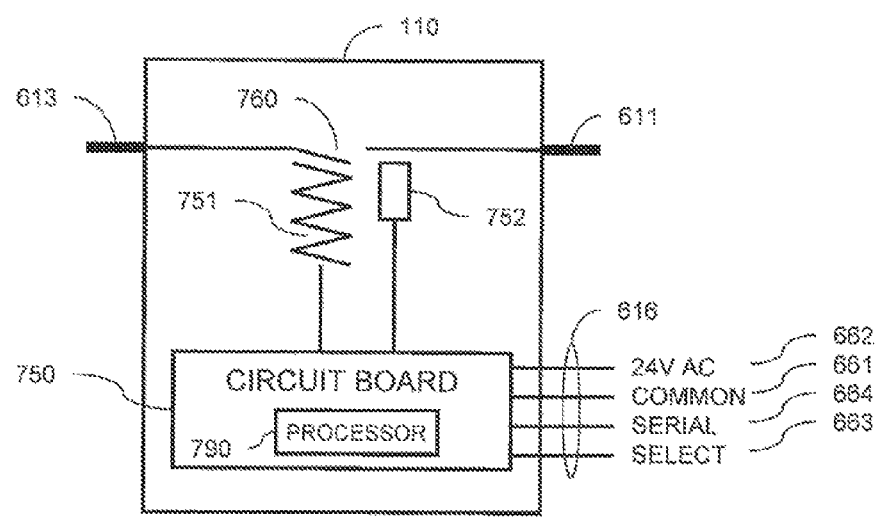
FIG. 7 is a schematic diagram of a remote operated relay according to one embodiment of the invention.

Electronics on the circuit board 750 (FIG. 7) within the remote operated device are used to control device functionality. For example, the board may control the opening and closing of the relay contacts under normal operating conditions by actuating a magnetically held solenoid (magnetic latch) 751 (FIG. 7). Power for the electronics is drawn from a 24V bus connected from the rail 115 to each device.

In a preferred embodiment, the printed circuit board (PCB) electronics 750 are at the bottom of the remote operated device, beneath the main conductor contact 611 and lug 613. Wires from the magnetic latch 751 are insulated and routed to a connector on the PCB 750. Wires from a relay position sensing mechanism 752 are also insulated and routed to a second connector on the PCB.

In the example where the remote operated device is a relay, the electronics circuit board 750 contained in a remote operated device may include two output circuits capable of pulsing the magnetic latch 751 at approximately 1.7 A and 24V. The "CLOSE" pulse is 2 to 2.5 ms in duration, and the "OPEN" pulse is 10 to 20 ms in duration. The "OPEN" pulse is opposite in polarity to "CLOSE" pulse. The PCB electronics 750 also include an input circuit for sensing the position of the contacts, and a "dry contact" input for EIB applications.

The processor 790 comprises an oscillator/microcontroller for output control and timing, input sensing, magnetic latch current sensing (if the device includes a magnetic latch) and serial communications to the I/O controller board. In addition, the circuit board 750 also preferably contains a voltage regulator/power supply circuit, an analog input circuit for magnetic latch current sensing and protection, a communications drive circuit for the serial bus and a buffer circuit for enable line.

The data rails 115A, 115B (FIG. 1) are shielded communication buses that allow communication among a plurality of remote operated devices 110 on one side of a panel 100, and the I/O controller board 120. In a preferred embodiment of the invention wherein a panel 100 contains positions for 42 breakers and 42 remote operated devices, each data rail 115 connects the 21 remote operated devices on a single side of the panel. Each panel includes two data rails.

The data rail provides a barrier to isolate the Class 1 load wires from the Class 2 signal wires used to manage the remote operated devices. The data rail 115 connects to each remote operated device 110 via a connector (not shown) that extends out of the remote operated device. The connector has four or five leads. Structurally, the data rail 115 may be used to support the remote operated devices and is mechanically attached directly to the interior of the panel 100.

The end connection of the data rail 115 to the I/O controller board 120 is a 25-29 conductor ribbon connector, depending on design details. This ribbon connector is protected from Class 1 elements and does not cover the neutral extension.

The data rails 115 may be made available in a plurality of sizes to allow customers to install various numbers of remote operated devices on a single panelboard. For example, rails may be made with 9, 15 and 21 available connections to remote operated devices. The rails may be made with two end connections for I/O controller boards 120, to allow for symmetrical data rails for the left and right hand side.

The data rail 115 may have provisions that encapsulate the Class 2 wiring connecting the devices together as well as any wire connections running from the remote operated devices to the data rail. The data rail, if appropriate, may be capable of moving into two different positions such that in a first position the remote operated devices are mechanically supported and the wire is sufficiently guarded, and in a second position, the devices are free to rotate.

The data rail 115 preferably comprises a PCB that contains traces including a plurality of line selector traces to route from the ribbon connection to each select line connector (one for each remote operated device position), a serial communication trace to all remote operated devices, 1-4 power traces for carrying 24 VDC from the ribbon connection to all devices, and 1-3 ground traces from the ribbon connection to all devices. In a preferred embodiment of the invention, reverse installation of the remote operated devices in the data rails is not possible.

The I/O controller board 120 (FIG. 3) implements several functions in the system. The board provides the discrete I/O to the panel via dry contact switches such as standard wall switches (not shown), connected to the I/O controller board via dry contact terminals 322 and dry contact logic 323. Each dry contact terminal 322 is organized as two inputs and a common. That facilitates inputs from momentary rocker switches.

As described above, the I/O controller board 120 also generates the selector line signals and serial communications to the remote operated devices 110 through the data rails 115. The processor 325 on the I/O controller board controls and generates all the communications to the devices, using selector logic 326.

The I/O controller board also implements an EIB interface. To an EIB network, that interface makes the panel appear as a single EIB device with 42 outputs and 32 inputs. The EIB interface may, for example, be implemented using a Siemens TPUart interface 327.

A low profile connector 328 located on the I/O controller board 120 allows directly mating a system controller 150. The I/O controller board 120 can operate as a stand-alone controller or connected to a system controller 150. Without a system controller, the I/O controller board 120 responds only to communications over the EIB interface and performs no actions on its own.

The EIB line is routed to the connector 328. The system controller 150 operates the remote operated devices 110 via the I/O controller board 120 using EIB messages. A separate SPI interface may also be supported on the connector 328. That interface may be used in lieu of the EIB for communication from the system controller 150 to the I/O controller board 120 in cases where bandwidth on the EIB network is insufficient.

The system controller 150 provides the user with an application to implement lighting schedules, organize devices into logical groups, manage the inputs, and get status. A local user interface is implemented by the system controller 150 as a 320×240 monochrome LCD display 151 with touch screen support.

The system controller 150 has several communications interfaces. The controller connects with one or more I/O controller boards 120 through an EIB interface 355. In addition, an RS485 serial interface 356 may support proprietary protocols such as Modbus RTU protocol, an interface to Siemens building automation systems. A 10/100 Ethernet interface 357 may support an HTTP server and Modbus TCP/IP. The HTTP server may allow the user to connect a thin net browser to the controller to perform all of the functions provided by the local user interface as well as some more complex configuration and programming features. A USB interface (not shown) may also be provided. Additionally, an analog modem 358 provides a means for connecting the system controller 150 and its panel to an analog telephone line for rudimentary control functions via a touch tone phone. Communications interfaces with other systems and protocols, existing or to be developed in the future, are also contemplated and are within the scope of the present invention.

The system controller 150 preferably contains sufficient storage for complicated lighting schemes, including schedules, zones, schema selections, logging, etc. That storage may require a small database, since a given controller may control up to 42 light switches locally and may control other lighting control panels remotely. In one embodiment, the system controller controls up to 64 panels. The total storage requirement may reach a maximum size of 20 GB, and is preferably at least 256 MB. That storage does not include storage required for the operating system.

Referring to FIG. 2, the power supply 209 provides an isolated power source to the all the control components including the remote operated devices, the I/O controller board 120, the system controller 150 and the EIB network. The I/O controller board 120 and the system controller 150 each have DC-DC converters deriving regulated DC voltage levels as required from the main DC output 225 of this power supply. In the case of remote operated relays, that main supply also provides 24 volts to the relays which the electronics modulates to operate the internal solenoids, via the rails 115A, 115B. Solenoids 751 in the remote operated devices (FIG. 7) require up to two amperes to operate and there may be up to 42 remote operated devices in a panel. The system manages operation of the devices so that the main dc power supply 209 will not have to source more than 3.5 amperes.

The power supply also has a second current limited supply (not shown) at 29 volts. That supply is used to source power for the EIB network. The output impedance of that supply is critical and must meet Konnex (EIB Specification Organization) specifications. That supply is preferably a current limiting supply that limits the output current to 325 milliAmperes in a dead short. The input to that supply should be universal such that the input power may be 50 or 60 Hertz and range from 90 to 290 volts RMS.

The fuse element 230 protects the power supply 209, system controller 150, and I/O controller board 120 from short circuits that occur on the bus. The fuse element 230 is positioned between the power supply and the bus itself. The customer has access to the fuse 230 in the event that an overcurrent is delivered to the entire panel.

In one embodiment of the present invention, proximity of the breakers 105 (FIG. 1) and remote operated devices 110 requires the use of a neutral extension (not shown) mounted to the subfeed neutrals of the panelboard. The neutral extension allows a user to gain additional low amperage neutral connections with the remote operated devices partially covering the normal neutrals.

The presently-described lighting control system may be implemented without changes to a standard panelboard. All connections for Class 2 wiring requires only drilling of the can to allow the Class 2 wire to be routed out of the panel.

As used herein, the term "controller box" refers to the box 190 (FIG. 1) containing electronics hardware associated with the I/O controller board 120, the system controller 150, and the touch screen 154. The controller box has necessary provisions to connect with the power supply and the data rails (which may require multiple connections).

Access points exist in the controller box 190 such that the customer can gain access to several connections. Those access points are covered with a removable lid such that the customer can gain access to the connections, but allow the connections to be guarded from incidental contact.

The entire controller box 190 fits within a slot of the panel 100 opposite the power lugs 125 for connecting power cables 126. For example, in one embodiment of the invention, the controller box fits within the TVSS slot of a standard P1 panelboard manufactured by Siemens Energy & Automation. By placing the controller box opposite the power entry point in the panel, a standard panelboard with little or no modification (other than drilling the panelboard for class 2 wiring) may be used.

Figure 6:
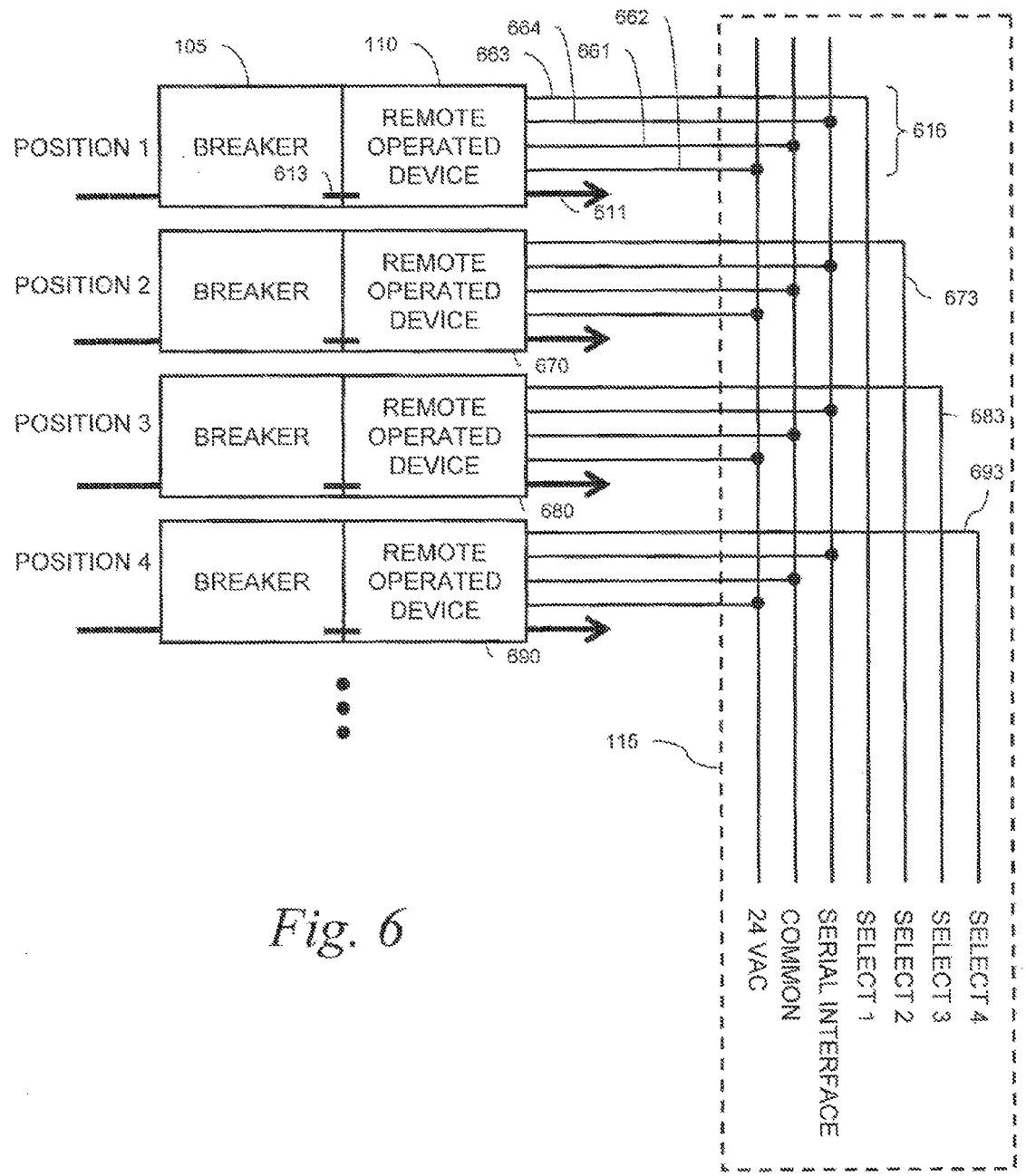
FIG. 6 is a schematic wiring diagram of a plurality of remote operated devices and breakers according to one embodiment of the invention.
Figure 8:
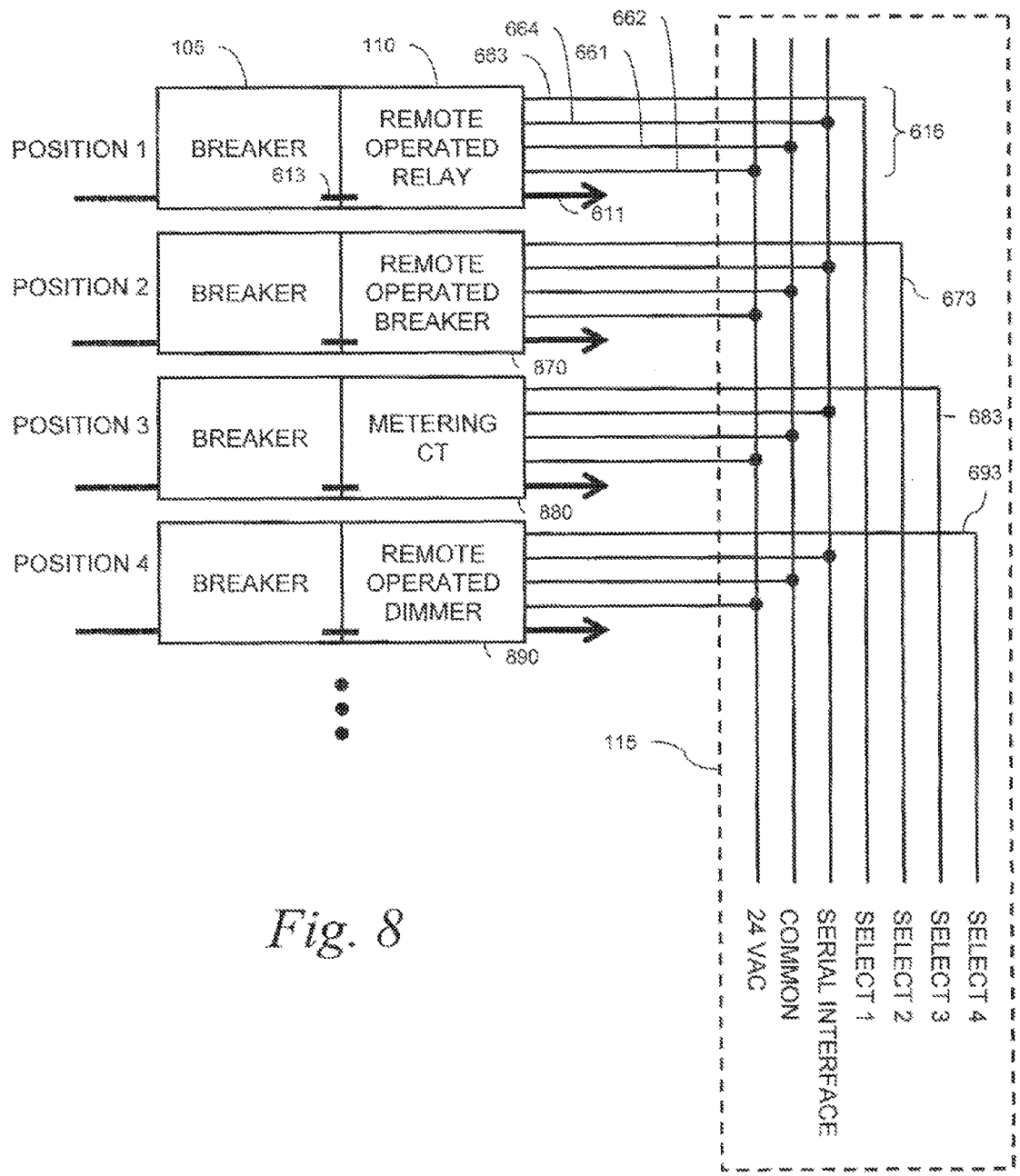
FIG. 8 is a schematic wiring diagram of a plurality of remote operated devices and breakers according to one embodiment of the invention.
Figure 9:
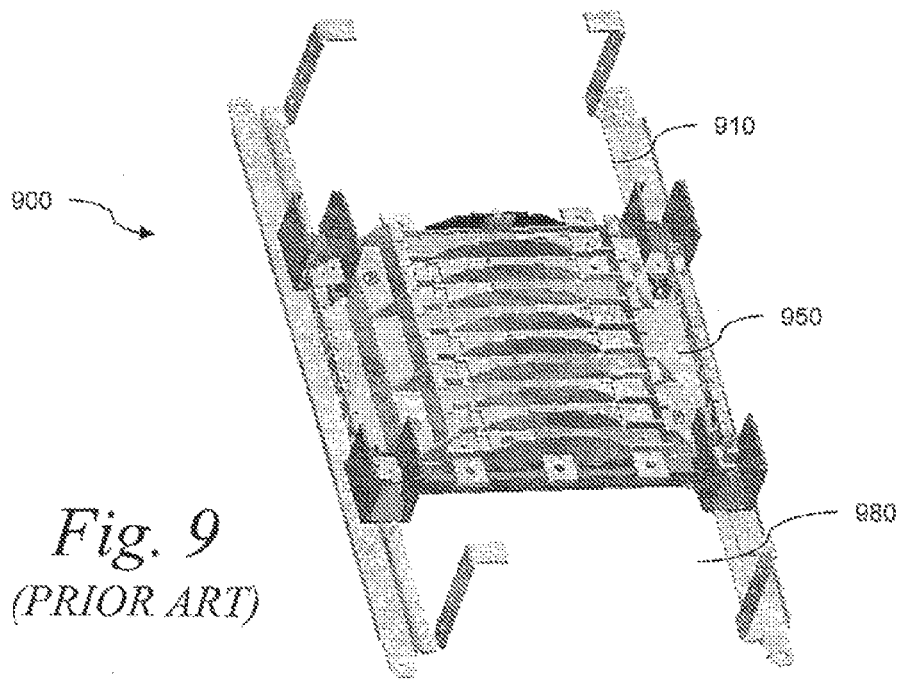
FIG. 9 is a perspective drawing of a prior art panelboard.
Figure 10:
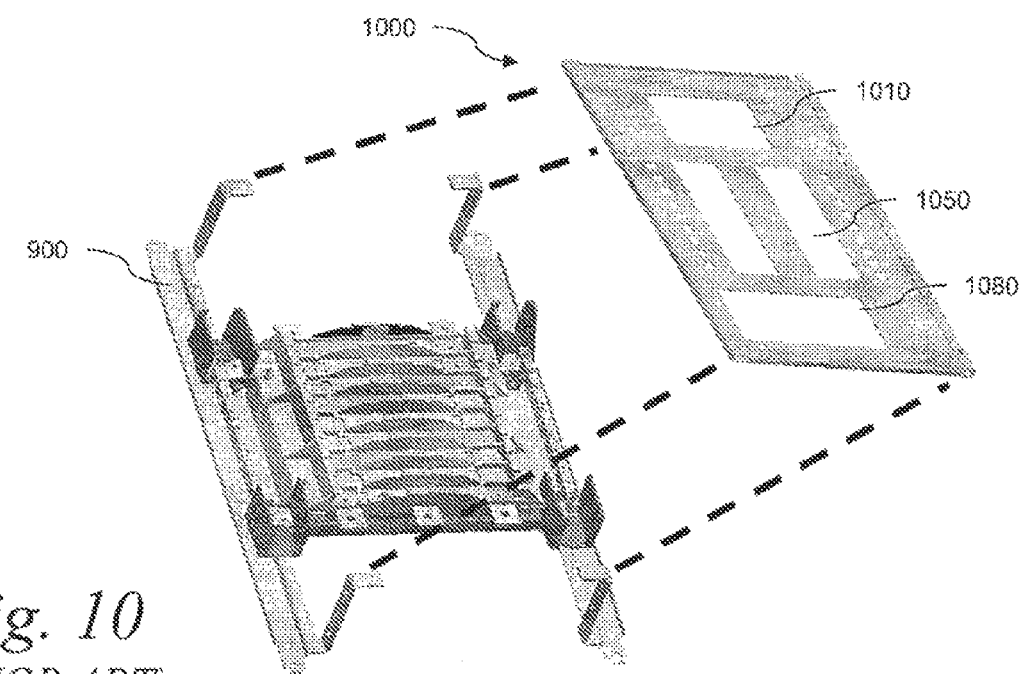
FIG. 10 is an exploded perspective drawing of a prior art panelboard and deadfront assembly.

A system similar to the system shown in the schematic illustration of FIG. 6 is illustrated in FIG. 8, wherein like elements are indicated by like element numbers. A remote operated relay 110 remains in position 1 of the panelboard. In position 2, however, a remote operated breaker 870 is installed. Likewise, a metering circuit 880 is installed in position 3 and a dimming device 890 is installed in position 4. The metering circuit may be remotely accessed to load stored consumption information as well as to access instantaneous current flow information to the load circuit associated with position 3. The dimming device may be controlled to regulate power delivered to the load circuit associated with position 4.

The devices 870, 880, 890 are merely exemplary, and other types of devices are contemplated as part of the invention. The present architecture permits additional devices to be easily added. Because a device "listens" to a command only when its select line is asserted, additional serial commands for added device types may be added to the protocol without changing existing devices. Any type of device may be placed in any position on the panelboard without altering the panelboard and without reprogramming the device.

Figure 11:
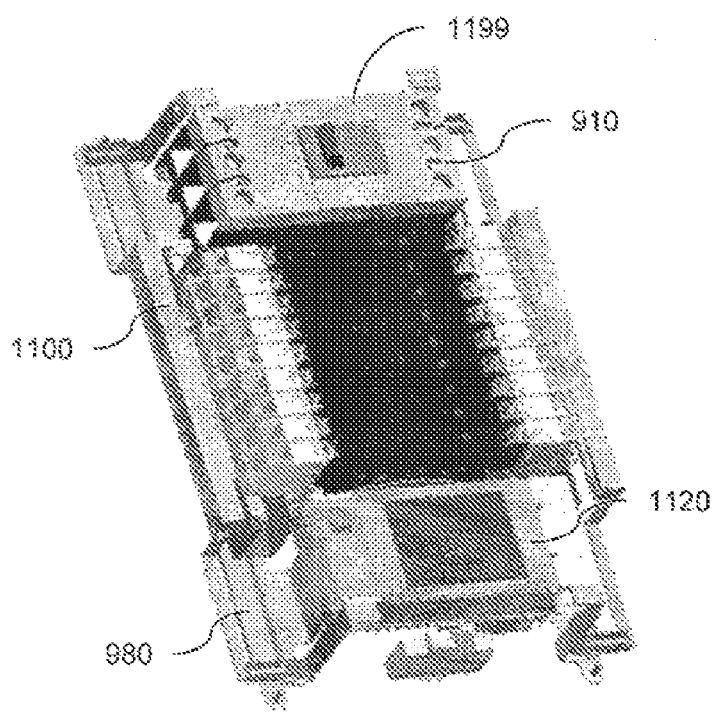
FIG. 11 is a perspective drawing of a panelboard and components according to one embodiment of the invention.
Figure 12:
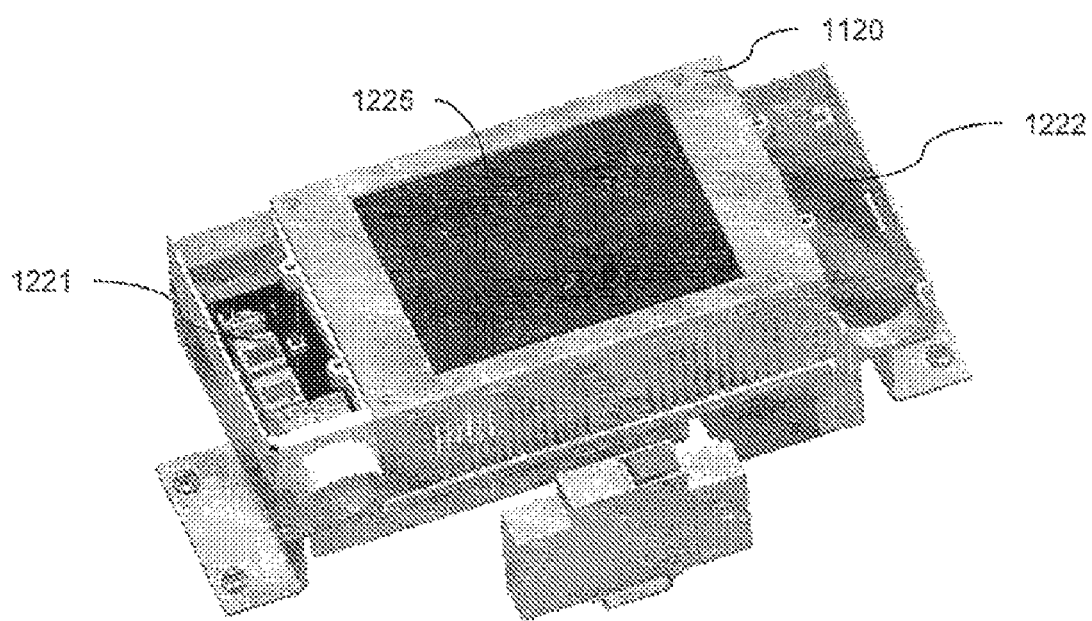
FIG. 12 is a perspective drawing of an I/O controller according to one embodiment of the invention.
Figure 13:
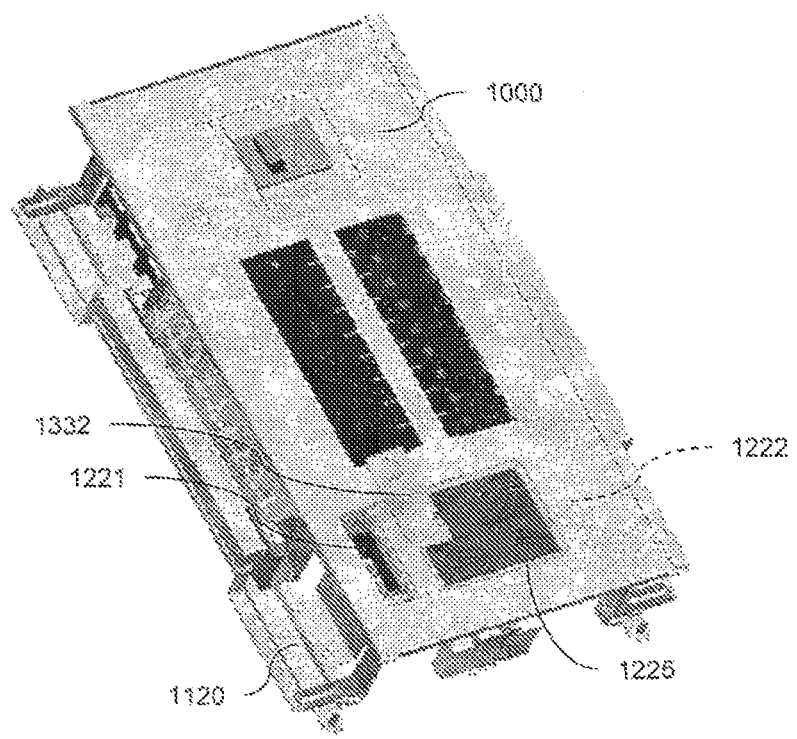
FIG. 13 is a perspective drawing of a panelboard and components including a deadfront according to one embodiment of the invention.
Figure 14:
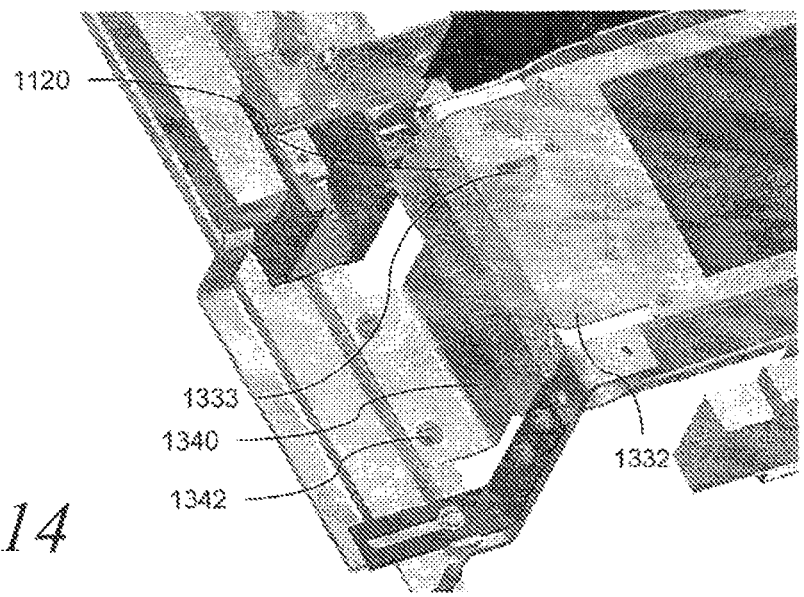
FIG. 14 is a detailed perspective drawing of an I/O controller according to one embodiment of the invention.

As noted above with reference to FIG. 1, the I/O controller board 120 is preferably placed in a position on the panelboard 100 opposite the main power connector (i.e., lugs 125 and/or main breaker). Referring now to FIG. 11, the controller box containing the I/O controller board 1120 is placed within the subfeed region 980 of the panelboard, which is opposite the main power lugs (not shown) and/or opposite the main breaker 1199 in the main breaker region 910. The subfeed region 980 on the panel is advantageous for mounting the controller box for several functional and design reasons. In general, the subfeed region of a panelboard already possesses an access point (no additional cutouts in the deadfront are required). The region is also easily accessed by users of the panel when the deadfront is secured to the panelboard.

Further, to position the controller in its own region (instead of the subfeed region) would require the redesign of many elements of an existing panelboard design including the deadfront, trim, door, and cover. Those elements, along with their associated hardware, represent over one-third of all parts within the system.

Additionally, the system of the invention places the controller box containing the I/O controller board 120 in a region of the panelboard where there is planar area with clear access to screw holes. Designs that utilize/extend elements in the branch breaker area are often more complex because tall thin barriers must be used to manage circuit breaker gases during short circuit.

Several techniques are currently used to mount controllers in a panelboard. One method is to extend the overall panelboard, thereby creating a new space for the controller. As previously noted, that method requires redesign of a substantial portion of the overall panelboard, which may further require separate manufacturing processes and inventories for panelboards to be used with controllers. In addition, that technique adds considerable length to the panelboard (ranging from 10-40% of additional length). Often, such designs also create issues with customer access, and secondary doors and hinges are required.

Another currently-used solution for placing a controller in a panelboard is to occupy a branch breaker position in the branch region of the panelboard. In order to position a controller in that region without decreasing the number of positions for branch breakers (commonly 42), the design requires an increase in the number of positions for branch devices. That solution also requires a complete redesign of the panelboard.

Positioning the controller in a branch breaker location limits access to the controller by the user. In general, the region of the branch devices is most prone to short circuits, which, in turn, generate outgassing clouds. To protect the user from those outgassings, an adequate seal is required between the deadfront and the branch device. Access holes through the deadfront must therefore be restricted in the branch device region, resulting in decreased visibility for the customer. Further, the overall accessible surface area in that region is often less that the subfeed region, thereby creating a more difficult design for the user access area.

In a preferred embodiment of the present invention shown in FIGS. 11-14, packaging the I/O controller board 1120 within the subfeed region of the panelboard yields a retrofitable system with a large number of user accessible features. Two types of accessible features are presented to a user: features 1221 accessible through the deadfront 1000, and features 1222 accessible only with deadfront removal. Features 1221 accessible through the deadfront 1000 include LEDs for status and power, building automation connections (EIB/Modbus RTU), Ethernet connections, USB access and telephone connectivity. Features 1222 accessible only with the deadfront removed (hidden in FIG. 13) include 32 2-position (digital) inputs and 4 analog input/outputs.

Additionally, a user can view and manipulate the touchscreen 1225 through an existing window in the deadfront 1000. In existing panels including a subfeed breaker and no I/O controller board, that window is used for access to the subfeed breaker.

A snapping lid 1332 that may be removed through the deadfront is used to cover those features 1221 accessible through the deadfront. In prior designs, snapping lids were used, but were locked into position by the deadfront. As a consequence, users could not access any connections without removing the deadfront. Removing the deadfront by the user requires that the user de-energize the entire panel.

In the preferred embodiment, the snapping lid 1332 has a recess feature 1333 (FIG. 14) whereby the user can pull the lid by pinching the feature between the index finger and thumb. The snapping lid feature is flush such that it can be used with panelboards that cover the area with deadfront metal.

The entire controller box including the I/O controller board 1120 is supported with a steel backplate 1340. That backplate allows for a simple screw access point for the panelboard. Only two screws 1342 (on the diagonal corners) are required to secure the panelboard. In the embodiment shown in FIG. 14, two screws are used on each side of the controller 1120; only one is necessary. Previous panel designs required multiple snapping features along with screws, or a large number of screws (some designs require up to 8 screws).

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while the apparatus is disclosed herein with respect to particular panelboard layouts and geometries, the techniques and configurations of the invention relating to select line addressing of the remote operated devices may be applied to any power distribution arrangement. It is to be understood that the embodiments shown and described herein are only illustrative of the principles of the present invention and that various modifications may be implemented by those skilled in the art without departing from the scope and spirit of the invention.

What is claimed is:

1. A system for selectively distributing electrical power from an electrical power source to a plurality of load circuits, comprising:
   a panelboard having a first end and a second end;
   a main power connector at the first end of the panelboard for connecting the electrical power source;
   a plurality of circuit breaker modules, each circuit breaker module being in a load circuit position in the panelboard and electrically connected to the main power connector;
   a plurality of remote operated devices, each remote operated device being electrically connected to the main power connector via a respective one of the plurality of circuit breaker modules and to a respective one of the plurality of load circuits, each respective remote operated device including a conductor tab configured to be inserted into the respective one of the plurality of circuit breaker modules;
   an I/O controller board electrically connected to the plurality of remote operated devices for controlling the plurality of remote operated devices, the I/O controller board being at the second end of the panelboard; and
   a data rail interconnecting the plurality of remote operated devices and the I/O controller board, the data rail comprising a shielded communication bus including a serial interface line and plurality of select lines, wherein the serial interface line connects the plurality of remote operated devices and the I/O controller board, the I/O controller board is connected to each of the plurality of remote operated devices by a respective one of the plurality of select lines, and a response by each of the plurality of remote operated devices to commands from the I/O controller board on the serial interface line is conditional on whether the respective one of the plurality of select lines is asserted.

2. The system of claim 1, further comprising a system controller connected to the I/O controller board for controlling the I/O controller board, the system controller being at the second end of the panelboard.

3. The system of claim 2, wherein the system controller further comprises an interface for controlling at least one additional I/O controller board.

4. The system of claim 1, wherein at least one of the plurality of remote operated devices is removable from the panelboard separately from the respective one of the plurality of circuit breaker modules.

5. The system of claim 1, wherein at least one remote operated device of the plurality of remote operated devices is a relay.

6. The system of claim 1, wherein at least one remote operated device of the plurality of remote operated devices is a dimming device.

7. The system of claim 1, wherein at least one remote operated device of the plurality of remote operated devices is a metering device.

8. The system of claim 1, wherein at least one remote operated device of the plurality of remote operated devices is a circuit breaker.

9. The system of claim 1, further comprising:
   a deadfront mounted to the panelboard, the deadfront at least partially covering the I/O controller board;
   wherein the I/O controller board further comprises at least one feature accessible through an opening in the deadfront.

10. The system of claim 9, wherein the at least one accessible feature is selected from a group consisting of an LED indicator for status and power, an EIB building automation connection, an Ethernet connection, a USB port and a telephone connection.

11. The system of claim 9, wherein the I/O controller board further comprises at least one feature not accessible through an opening in the deadfront.

12. The system of claim 9, further comprising: a snap lid for covering the at least one accessible feature, the snap lid being removable through the opening in the deadfront.

13. The system of claim 12, wherein the snap lid is flush with the I/O controller board.

14. The system of claim 1, wherein the I/O controller board is mountable to the panelboard using at most two screws.

15. The system of claim 1, wherein the I/O controller board is adapted to provide an assert signal to each of the plurality of remote operated devices on the respective one of the plurality of select lines causing each of the plurality of remote operated devices to receive commands on the serial interface line of the data rail.

16. The system of claim 1, wherein each of the plurality of load circuits is connected to a load lug of each a respective one of the plurality of remote operated devices to electrically connect each of the plurality of load circuits to the electrical power source.

17. A method for configuring a power distribution panel, comprising the steps of:
   installing a main breaker in a main breaker region of a panelboard;
   installing a plurality of circuit breaker modules, each circuit breaker module being in a load circuit position in the panelboard and connected to the main breaker for distributing electrical power to a plurality of branch circuits;
   installing a plurality of remote operated devices in a branch breaker region of the panelboard, each of the plurality of remote operated devices being electrically connected via a respective one of the plurality of circuit breaker modules to the main breaker for distributing electrical power to the plurality of branch circuits, each respective remote operated device including a conductor tab configured to be inserted into the respective one of the plurality of circuit breaker modules during the installing; and installing an I/O controller board in a subfeed region of the panelboard different from the main breaker region and the branch breaker region, the installing of the I/O controller board comprising installing a data rail for electrically connecting the I/O controller board to each of the plurality of remote operated devices, the data rail comprising a shielded communication bus including at least a serial interface line and a plurality of select lines, the I/O controller board being electrically connected to the plurality of remote operated devices by the serial interface line for commanding each remote operated device to perform an operation on the electrical power distributed to a respective one of the plurality of branch circuits, the I/O controller board being electrically connected to each of the plurality of remote operated devices by a respective one of the plurality of select lines, wherein a response by each of the plurality of remote operated devices to commands from the I/O controller board on the serial interface line is conditional on whether the respective one of the plurality of select lines is asserted.

18. The method of claim 17, wherein the data rail is secured directly to the panelboard and supports each of the plurality of remote operated devices.

19. The method of claim 17, further comprising the step of: mounting a deadfront to the panelboard, the deadfront having openings for portions of the I/O controller board.

20. The method of claim 19, wherein the I/O controller board includes a touchscreen, and one of the openings of the deadfront exposes the touchscreen.

21. The method of claim 19, wherein the I/O controller board includes I/O connectors, and one opening of the openings of the deadfront exposes at least one of the I/O connectors.

22. The method of claim 19, further comprising the step of: mounting a removable snap lid on the I/O controller board through one of the openings in the deadfront for covering accessible features.

23. The method of claim 17, wherein the step of installing the I/O controller board in the subfeed region of the panelboard comprises using at most two screws.

24. The method of claim 17, wherein the I/O controller board is adapted to provide an assert signal to each of the plurality of remote operated devices on the respective one of the plurality of select lines causing each of the plurality of remote operated devices to receive commands on the serial interface line of the data rail.

25. The method of claim 17, further comprising connecting each of the plurality of branch circuits to a load lug of each a respective one of the plurality of remote operated devices to electrically connect each of the plurality of branch circuits for distributing electrical power.

* * * * *